June 9, 1964 R. E. HILL 3,136,071
RETRACTABLE CUTOFF GAUGE
Filed Sept. 6, 1962
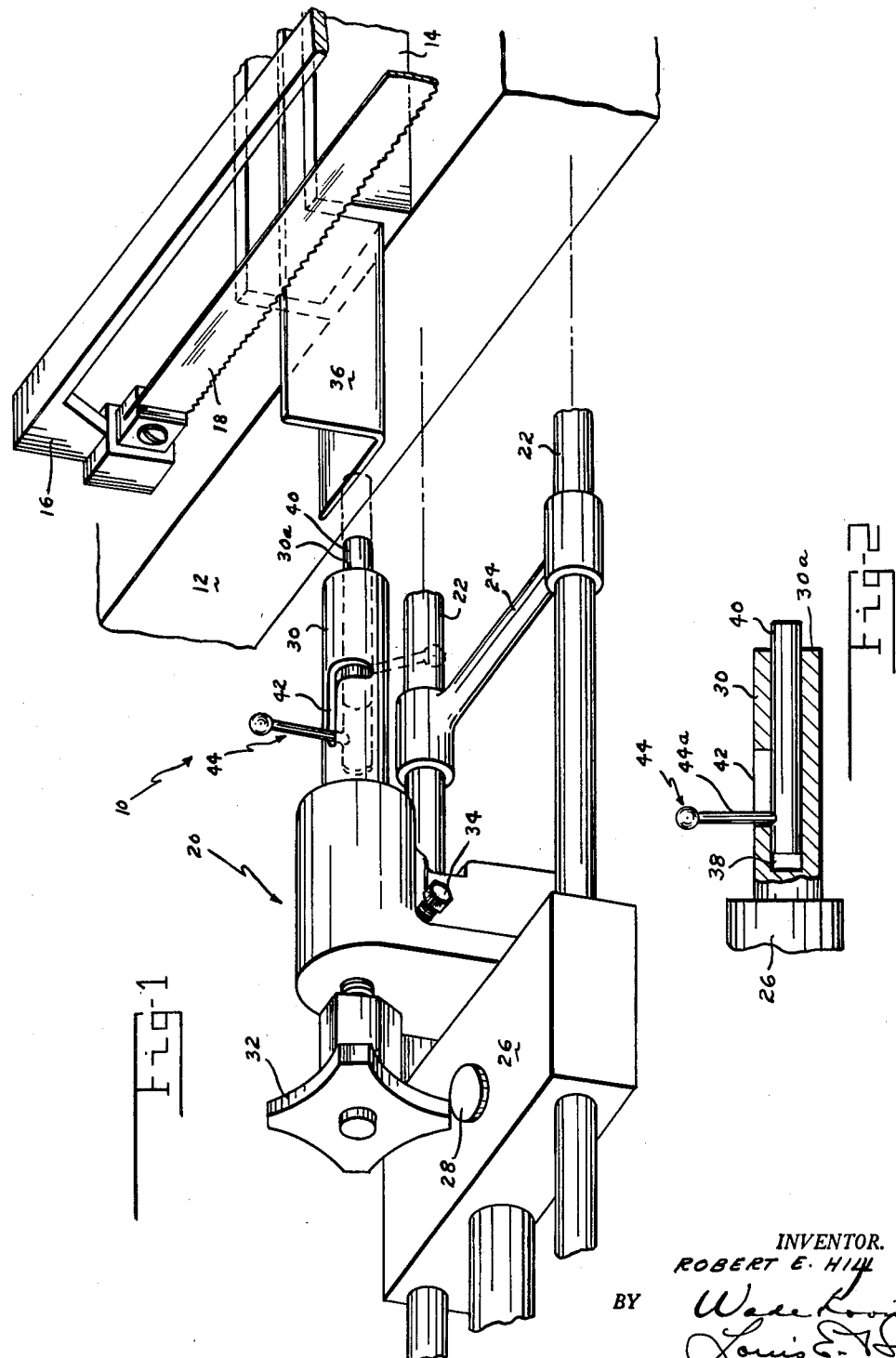
INVENTOR.
ROBERT E. HILL
BY
ATTORNEYS United States Patent Office 3,136,071
Patented June 9, 1964

3,136,071
RETRACTABLE CUTOFF GAUGE
Robert E. Hill, 130 Ravenhill, San Antonio, Tex.
Filed Sept. 6, 1962, Ser. No. 221,921
6 Claims. (Cl. 33—180)
(Granted under Title 35, U.S. Code (1952), sec. 266)

The invention described herein may be manufactured and used by or for the Government for governmental purposes without the payment to me of any royalty thereon.

This invention relates to gauges used on cutting machines such as power saws. More specifically, this invention relates to gauges establishing the length of repetitive pieces cut from bar stock by such a machine.

Cutoff machines, such as power saws, normally employ an adjustable gauge which may be set to gauge the length of the piece to be cut from the bar stock. The usual set-up procedure is to push the end of the bar stock against the gauge and tighten the jaws holding the bar stock firmly in the machine.

The conventional gauge remains in contact with the bar stock while the machine is in operation. This contact with the gauge often results in broken saw blades and ragged cuts, especially when irregularly shaped material such as angle iron is being severed. This is often caused when the severed piece, instead of falling clear, attempts to wedge between the saw blade and the gauge. Another result of the contact between the bar stock and gauge while the machine is in operation, is the frequent occurrence with which the gauge becomes displaced from its correct setting. This requires that the gauge be rechecked between successive cuts and reset as required.

The primary object of this invention is to provide a retractable gauge which may be retracted from the bar stock after the set-up is made.

Another object of this invention is to provide a retractable gauge having utmost simplicity and ease of manufacture.

A further object of this invention is to provide a retractable gauge which may easily be incorporated into many of the conventional gauges which are standard equipment on most cutoff machines.

Additional objects, advantages and features of the invention reside in the construction, arrangement and combination of parts involved in the embodiment of the invention as will appear from the following description and accompanying drawing, wherein:

FIG. 1 is a fragmentary perspective of a power saw with attached gauge, and illustrating the operation of the retractable cutoff gauge.

FIG. 2 is a vertical section through the gauge member of a conventional gauge, and illustrating the manner of incorporating the retractable cutoff gauge therein.

Referring to the drawing, the power saw referred to generally as 10, shows a portion of the frame 12, material holding jaws 14 joined to the frame, the saw yoke 16 and saw blade 18 removably held by the yoke.

Joined to the power saw 10, in a manner not forming part of this invention, is a conventional gauge referred to generally as gauge 20. The gauge 20 includes a plurality of rods 22 at right angle to the saw blade 18 and held in spaced parallel relationship by support 24. Longitudinally slidable on rods 22 is housing 26 which is held in place by bolt 28. Axially slidable within housing 26 is a shaft gauge member 30. The gauge member 30 is nonrotatable but axially movable at right angle to the saw blade in the manner of a tail stock on an engine lathe. The gauge member 30 is axially positioned by knob 32 and held in place by lock screw 34.

The normal use of the gauge 20, as described, is to slide the housing 26 to an approximate position on rods 22; making the final adjustment with knob 32. The gauge is adjusted to such position that when the end of bar stock 36 abuts against the end 30a of gauge member 30, the proper piece length to be cut from the bar stock 36 is established.

The particular embodiment of the invention shown modifies the commercially available gauge as above described. End 30a of gauge member 30 is axially machined to contain a bore 38 for slidably receiving plunger rod 40, as best shown on FIG. 2. As best shown on FIG. 1, an elongated slot 42 is machined perpendicularly through the wall formed by the outer surface and the bore 38 of gauge member 30. As shown, the slot 42 has a first long leg parallel to the axis of gauge member 30 and a shorter second leg at right angle thereto. Threadably joined to plunger rod 40 is an operating handle 44 which is at right angle to the axis of plunger rod 40, as best shown on FIG. 2. Shank 44a of operating handle 44 is of proper diameter to be freely slidable in slot 42 with a minimum amount of clearance. Slot 42 is in proper circumferential position that when the operating handle 44 is in the short leg, gravity will retain it in such position.

It is noted that the retractable cutoff gauge has a "bolt-action" rifle operation. That is, the plunger rod is axially movable, and is held in its forward position by a right angle rotary movement of the operating handle.

In operation, when a set-up is to be made, the retractable cutoff gauge is set to the extended position shown by phantom lines on FIG. 1. The gauge 20 is then adjusted to the proper position as previously described; with the bar stock 36 abutting against the end of the plunger rod 40 as shown. After the set-up has been made, the plunger rod 40 is retracted to the position shown as being out of contact with the bar stock.

It is to be understood that the embodiment of the present invention as shown and described is to be regarded as illustrative only and that the invention is susceptible to variations, modifications and changes within the scope of the appended claims.

I claim:

1. A retractable cutoff gauge for establishing the length of piece cut from bar stock in a cutoff machine comprising; a gauge member movable at right angle to the cutting tool of the cutoff machine, a retractable plunger rod slidably retained by said gauge member for movement at right angle to the cutting tool of the cutoff machine, and an operating handle joined to said plunger rod for extending and retracting said plunger rod.

2. A retractable cutoff gauge for establishing the length of piece cut from bar stock in a cutoff machine comprising: a gauge member, said gauge member being a shaft axially movable at right angle to the cutting tool of the cutoff machine, a retractable plunger rod slidably retained by said gauge member for axial movement parallel with the movement of said gauge member, and an operating handle joined to said plunger rod for extending and retracting said plunger rod.

3. A retractable cutoff gauge for establishing the length of piece cut from bar stock in a cutoff machine comprising; a gauge member movable at right angle to the cutting tool of the cutoff machine, a retractable plunger rod slidably retained by said gauge member for movement at right angle to the cutting tool of the cutoff machine, and an operating handle joined to said plunger rod for extending and retracting said plunger rod, said gauge member having means limiting the movement of said retractable plunger.

4. A retractable cutoff gauge for establishing the length of piece cut from bar stock in a cutoff machine comprising: a gauge member, said gauge member being a shaft axially movable at right angle to the cutting tool of the cutoff machine, a retractable plunger rod slidably retained by said gauge member for axial movement parallel with the movement of said gauge member, and an operating handle joined to said plunger rod for extending and retracting said plunger rod, said gauge member having means limiting the axial movement of said retractable plunger.

5. A retractable cutoff gauge for establishing the length of piece cut from bar stock in a cutoff machine comprising: a gauge member, said gauge member being a shaft axially movable at right angle to the cutting tool of the cutoff machine and containing a coaxial bore in the forward end and an elongated slot passing through the wall formed by the circumference and the bore of said gauge member, a retractable plunger rod slidably retained within the bore of said gauge member, and an operating handle passing through the elongated slot in said gauge member and joining to said plunger rod for extending and retracting said plunger rod within the limits of the elongated slot in said gauge member.

6. A retractable cutoff gauge for establishing the length of piece cut from bar stock in a cutoff machine comprising: a gauge member, said gauge member being a shaft axially movable at right angle to the cutting tool of the cutoff machine and containing a coaxial bore in the forward end and a slot passing through the wall formed by the circumference and the bore in said gauge member, said slot having a first leg parallel to the axis of said gauge member and a second leg perpendicular to the axis of said gauge member, a retractable plunger rod slidably retained within the bore of said gauge member, and an operating handle passing through the slot in said gauge member and joining to said plunger rod for extending and retracting said plunger rod within the limits of the first leg of the slot and holding said plunger rod in the extended position by engaging the second leg of the slot in said gauge member.

No references cited.